United States Patent [19]

Goscenski, Jr.

[11] Patent Number: 4,488,454

[45] Date of Patent: Dec. 18, 1984

[54] BALKING CLAMP POSITIVE DRIVE

[75] Inventor: Edward J. Goscenski, Jr., Battle Creek, Mich.

[73] Assignee: Eaton Corporation, Cleveland, Ohio

[21] Appl. No.: 356,873

[22] Filed: Mar. 10, 1982

[51] Int. Cl.³ .......................... F16H 35/04; F16H 1/44
[52] U.S. Cl. ......................................... 74/650; 74/711
[58] Field of Search ........................ 74/650, 710.5, 711

[56] References Cited

U.S. PATENT DOCUMENTS

| | | | |
|---|---|---|---|
| 1,111,728 | 9/1914 | Besserdich et al. | 74/710.5 |
| 1,275,952 | 8/1918 | Laxmore | 74/650 |
| 1,477,310 | 12/1923 | Cartwright | 74/650 |
| 1,477,311 | 12/1923 | Cartwright | 74/650 |
| 1,704,861 | 3/1929 | Lewis | 74/650 |
| 2,060,558 | 11/1936 | DeLavaud | 74/650 |
| 2,179,923 | 11/1939 | DeLavaud | 74/650 |
| 2,509,560 | 5/1950 | Craft | 74/650 |
| 2,555,044 | 5/1951 | Lewis | 74/650 |
| 2,667,088 | 1/1954 | Myers | 74/650 |
| 2,978,929 | 4/1961 | Roberts | 74/711 |
| 3,313,180 | 4/1967 | Balfour et al. | 74/711 |
| 3,397,593 | 8/1968 | Knoblock | 74/650 |
| 3,831,462 | 8/1974 | Baremor | 74/711 |
| 4,159,650 | 7/1979 | Tomich | 74/650 |
| 4,400,996 | 8/1983 | Schon | 74/650 |

FOREIGN PATENT DOCUMENTS

| | | | |
|---|---|---|---|
| 2475660 | 8/1981 | France | 74/650 |
| 485519 | 10/1953 | Italy | 74/650 |
| 111670 | 8/1918 | United Kingdom | 74/650 |

Primary Examiner—George H. Krizmanich
Assistant Examiner—Dirk Wright
Attorney, Agent, or Firm—C. H. Grace; L. J. Kasper

[57] ABSTRACT

A positive drive having a housing (10) retaining a pair of spaced drive clutches (54) and (56) used to lock axles (18) and (20) respectively to housing (10) for one-to-one rotation. The clutches move from the engaged to the disengaged mode via axial movement of drive couplings (30) and (32) which are forced to the respective engaged positions by a shaft (48) secured for rotation with the housing. The shaft acts on cams (38) and (40) on the drive couplings to cause rotational and axial movement of the couplings. Rotational movement of one drive coupling relative to the other drive coupling is prevented by a balking clamp (76). The clutches (54) and (56) are inserted within the housing through a window (14). The axles are retained by "C" clips (80) contacting spline couplings (26) and (28).

13 Claims, 6 Drawing Figures

BALKING CLAMP POSITIVE DRIVE

Traction modifying devices find utility in driving wheels of vehicles through snow and in off-road conditions. These devices are generally categorized in one of three classes:

1. Limited slip differentials such as illustrated in U.S. Pat. Nos. 3,624,717 (spring biased), and 3,611,833 (non-biased);
2. Locking differentials such as illustrated in U.S. Pat. Nos. 3,831,462 (speed responsive); 1,111,728 (manually actuated), and 2,978,929 (hydraulically operated); and
3. Positive drives such as illustrated in U.S. Pat. Nos. 1,477,311; 2,060,558; and 2,179,923.

This application is directed to an improved positive drive.

During straight movement of a vehicle employing a positive drive the power from the engine is transmitted approximately equally to each of the driving wheels. During a potential spinning condition, where one wheel may be located on ice and the other wheel located on dry pavement, the engine's power is transmitted to each of the wheels in proportion to their driving traction limitations to cause the wheels to rotate at the same angular velocity. When the vehicle, however, turns a tight corner the power transmission is passed only through the slower moving wheel. The faster moving wheel is permitted to free wheel. When the vehicle is turning less than a tight corner but is not moving in a straight line, the positive drive transmits driving torque to each of the driving wheels in a proportion that is less than equal. Thus a positive drive acts as an open differential during operating conditions where an open differential is desired and a rigid axle during operating conditions where a rigid axle is desired.

The method of accomplishing the foregoing results has been known for over 40 years as evidenced by U.S. Pat. Nos. 2,060,558 and 2,179,929. In positive drives, the drive cam couplings must not allow opposed engagement (i.e., one drive clutch is engaged to drive forward while the other drive clutch is engaged to drive in reverse). Thus, when a drive clutch must overrun, it is important to restrict the degree of travel of the cam to prevent any possible opposed engagement. In a turn, opposed engagement would cause the outside wheel to retard motion or drag to such a degree that a wheel would have to slip. Such slipping typically results in a torque of 1000 ft. lbs. on a dry surface.

Another major disadvantage of previously known positive drives is that they employ a central cam member which requires the use of a two piece housing. Since tremendous axial forces are exerted on the components of a positive drive and the housing, the two pieces must be securely fastened. The manufacture and assembly of two piece housings is also both time consuming and expensive.

As vehicles are continually "downsized" it is desirable to produce traction modifiers of minimal size and weight. The use of the central cam members to date in positive drives has made such production extremely difficult.

Further, it is desirable to have a traction modifier that is readily understood and easy to repair by a mechanic.

It is also desirable to have a traction modifier that may be used in applications where retention of the axles within the traction modifier housing is desired.

It is an object of the applicant to provide a positive drive that is simple to manufacture and repair without introducing substantially new manufacturing or mechanical know-how.

A further object is to provide a positive drive that has minimal size and weight.

Another object is to provide a positive drive of a design that has components that are similar to those existing in standard open, limited slip and/or locking differentials.

It is yet another object to provide a positive drive that may be produced on tools and equipment currently being used to produce existing open, limited slip and/or locking differentials.

Yet another object is to provide a traction modifier of a design in which inboard retention of the axles may be easily accomplished in an accepted manner.

Figure 1:
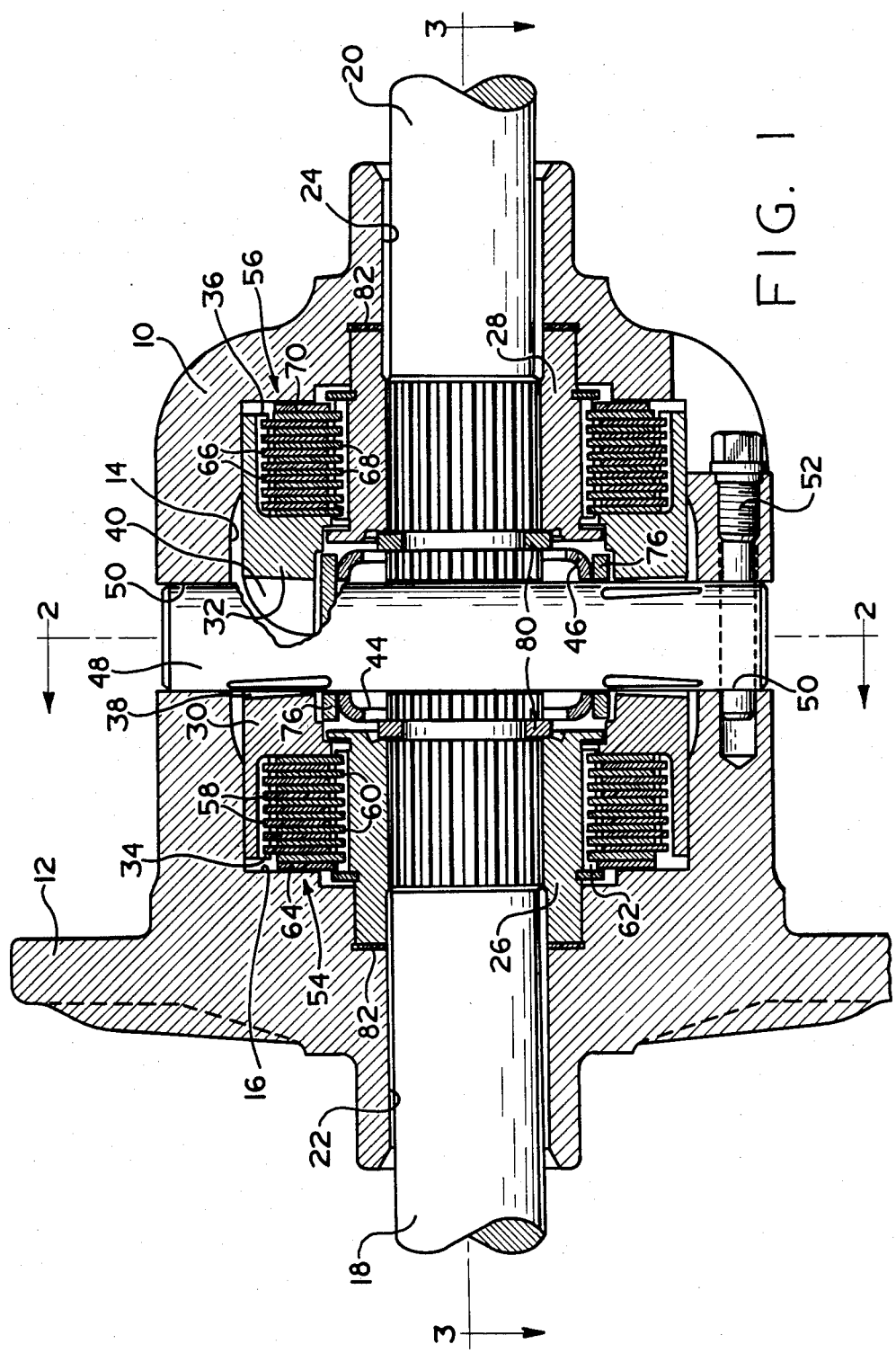
FIG. 1 is a fragmentary sectional view of a positive drive taken along line 1—1 of FIG. 2.
Figure 2:
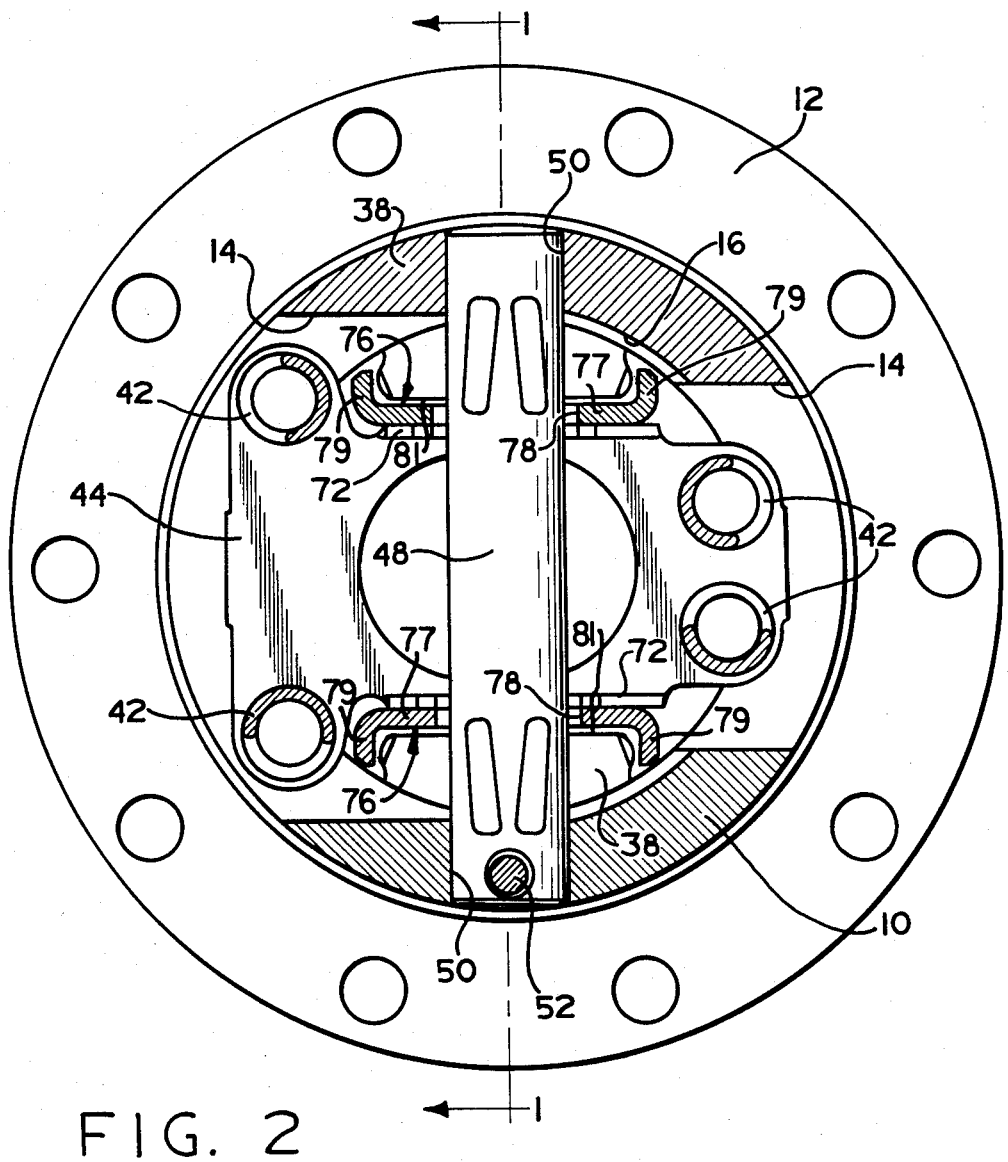
FIG. 2 is a sectional view taken along line 2—2 of FIG. 1.
Figure 3:
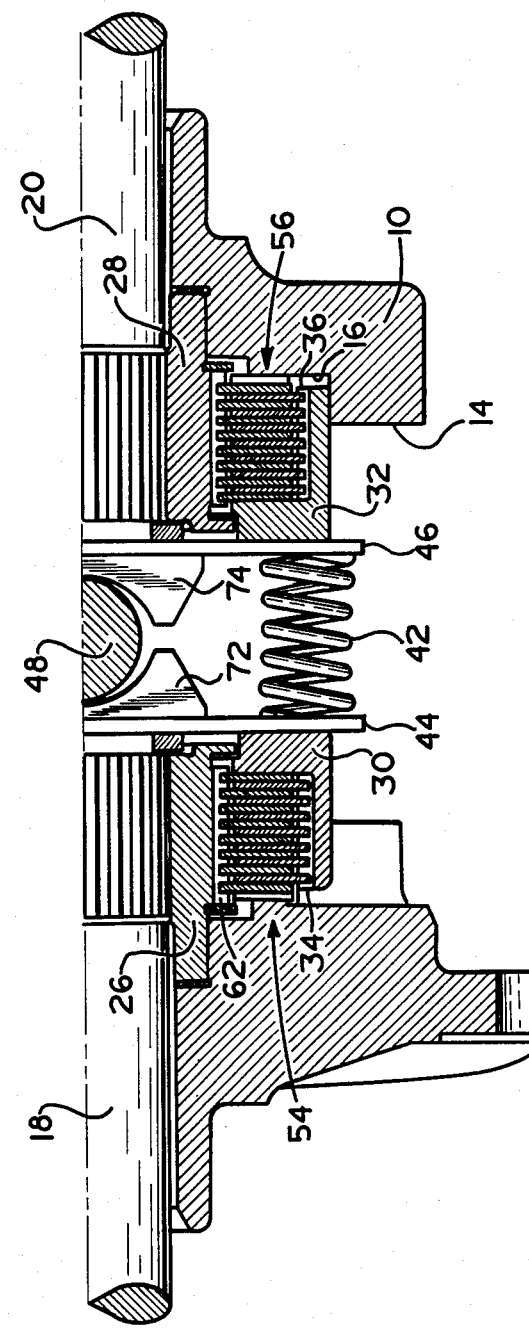
FIG. 3 is a sectional view of one-half of a positive drive taken along line 3—3 of FIG. 1.

In FIGS. 1-3 a one piece housing 10 has a flange 12 that is designed for securement to an input gear. A pair of windows 14 are located in housing 10 and are sized for insertion of the components of the positive drive within cavity 16 of housing 10. A pair of axles 18 and 20 are rotatable within axially aligned openings 22 and 24 in the housing.

Components of the drive include a pair of identical rotatable spline couplings 26 and 28 having internal teeth engaged with teeth on inner ends of axles 18 and 20. A pair of identical drive couplings 30 and 32 are journalled in cavity 16 for rotation relative to housing 10. Couplings 30 and 32 each include an internal array of teeth 34 and 36 and spaced, radially disposed cams 38 and 40 best illustrated in FIGS. 4-6. The cam 38 defines a forward cam surface 39a and a rearward cam surface 39b, while the cam 40 defines a forward cam surface 41a and a rearward cam surface 41b. Preloaded springs 42 contact at each end a pair of identical spring plates 44 and 46 in contact with couplings 30 and 32 to bias the drive couplings axially outwardly toward axles 18 and 20.

Interposed between cams 38 and 40 is a shaft 48 having eight cam surfaces, four on each end, for engagement with cam surfaces of cams 38 and 40. The shaft projects through a pair of aligned openings 50 in housing 10 and is secured to the housing by a fastener 52. Although shown as generally cylindrical, shaft 48 may have a cross section that is not circular, e.g., the cross section may be a square, a hexagon, or of variable cross section as long as it may be placed within its given location.

Drive clutches 54 and 56 each include annular discs, a drive coupling, and a spline coupling. Discs 58 of clutch 54 have teeth engaged with teeth 34 of drive coupling 30 and discs 60 of clutch 54 are interposed between each of the discs 58 and have teeth engaged with an external array of teeth 62 on spline coupling 26. The toothed engagement of the discs ensure one-to-one rotation of each of the discs with the respective coupling. An annular thrust washer 64 is interposed between the disc 58 farthest to the left in FIG. 1 and housing 10. The disc 60 farthest to the right in FIG. 1 contacts a radially extending annular surface of drive coupling 30. Clutch 56 is configured similar to clutch 54 with discs 66 and 68 and thrust washer 70. The annular discs 58, 60, 66, and 68 are well known in the traction modifying differential art as illustrated by U.S. Pat. No. 3,313,180 and may be secured to the respective coupling by means other than teeth to accomplish the one-to-one rotation.

Spring plates 44 and 46 include a pair of spaced wings 72 and 74 which encircle shaft 48 and form a support for balking clamps 76. The balking clamps each include a base 77 (FIG. 2), an opening 78 to loosely receive shaft 48 and a pair of upstanding arms 79. The base 77 of each balking clamp 76 is disposed adjacent a pair of platform surfaces 81 (see FIG. 2) which are defined by the cams 38 and 40.

To assemble the drive without the axles, the clutches 54 and 56 are first preassembled, turned so that the cams 38 and 40 are disposed 90 degrees relative to one another to allow for insertion into a window 14 and then are located together within cavity 16 through the window. The clutches are thereafter oriented as illustrated in FIG. 1 with cams 38 and 40 adjacent one another. The balking clamps are next located within the cavity in relation to cams 38 and 40. The spring plates 44 and 46 with springs 42 in place are then inserted within a window 14 and are aligned in a manner to allow the insertion of shaft 48 between wings 72 and 74 which will thus support each of the balking clamps 76. Shaft 48 is thereafter inserted within openings 50 and 78 between cams 38 and 40 and wings 72 and 74. Fastener 52 is then used to secure shaft 48 to housing 10 to complete the assembly.

Axles 18 and 20 may be secured to the drive in a known manner. Briefly, the assembly includes the steps of removing shaft 48, locating the axles 18 and 20 one at a time thru drive couplings 26 and 28, installing "C" clips 80 within grooves in the end of the axles then pulling axles 18 and 20 outward to secure "C" clips 80 and then replacing shaft 48. The ends of the axles should preferably loosely touch shaft 48 with the "C" clips in engagement with one end of the spline coupling. The other ends of the spline coupling will contact a thrust washer 82 engaged with housing 10.

Many of the components illustrated are similar to those currently being used in limited slip differentials manufactured by Eaton Corporation. Further the assembly of the positive drive is very similar to that of current open or limited slip differentials manufactured by Eaton Corporation or other parties. Accordingly, the commonality of parts and the assembly techniques will be relatively common to production workers who manufacture the positive drive and mechanics who may subsequently be asked to repair or replace drives.

Figure 4:
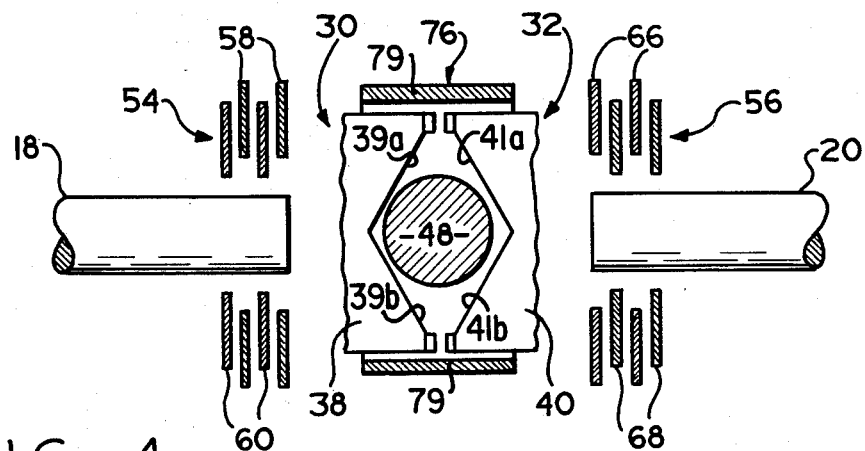
FIG. 4 is a view of components of the positive drive, in partial schematic, illustrating a positive drive in a nondriving condition.
Figure 5:
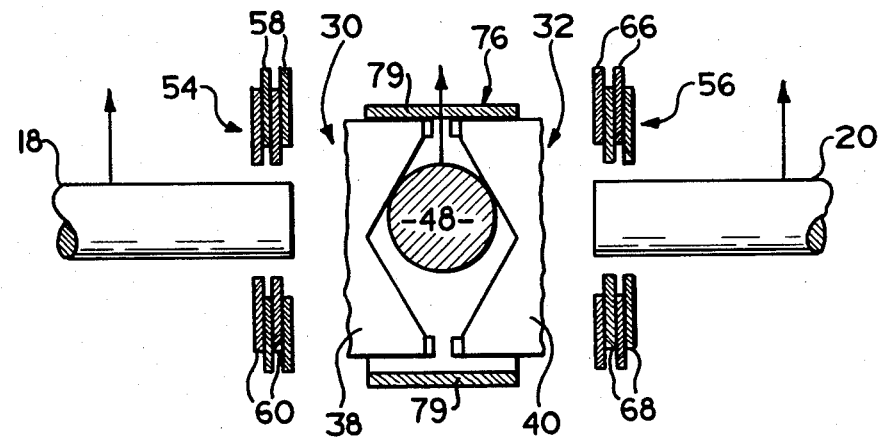
FIG. 5 is a view similar to FIG. 4 illustrating the drive driving both axles of a vehicle.
Figure 6:
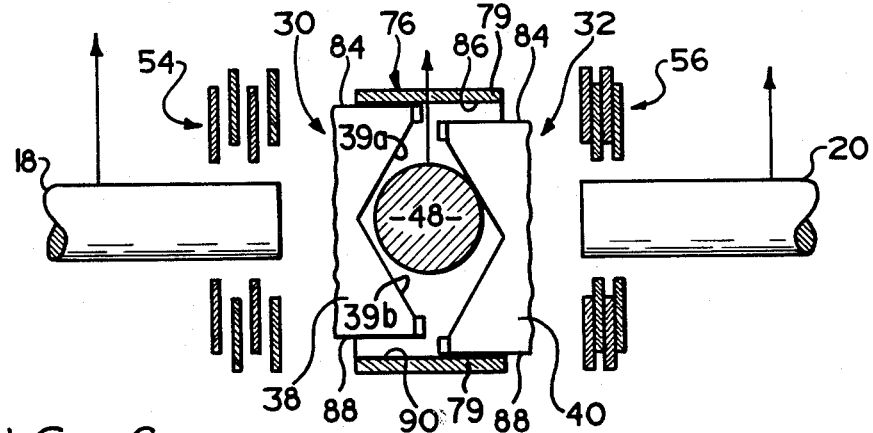
FIG. 6 is a view similar to FIG. 4 illustrating the drive driving one axle of a vehicle while permitting the other axle to free-wheel.

The operation of the positive drive is best described with reference to FIGS. 4-6. The positive drive may be used in either front wheel or rear wheel drive vehicles or between two drive axles. It will be described with reference to a rear drive automotive application. FIG. 4 shows the vehicle in a stationary position with axles 18 and 20 connected to ground engaging wheels. Shaft 48 is secured to housing 10 which is rotated by an input gear supplied with power from the engine of the automobile. Rotation of couplings 30 and 32 without springs 42 will be resisted to some degree by the friction between the discs. The degree of resistance is increased by the preloaded force exerted by springs 42. Upon rotation of housing 10 and, accordingly, shaft 48 during straight movement of the automobile, the surfaces on shaft 48 contact surfaces 39a and 41a on cams 38 and 40 forcing couplings 30 and 32 axially outwardly. This axial movement results in contact between the discs and their engagement with the thrust washer and the housing. This results in a condition illustrated in FIG. 5 and the subsequent rotation of axles 18 and 20 in a one-to-one relationship. The clutches are designed as fully locking self-energizing clutches to ensure complete lock-up once engagement is initiated.

When the resistance to rotation on one axle is relatively low when compared to the resistance to rotation of the other axle, such as when one wheel of the automobile is located on ice and the other wheel is located on dry pavement, movement of shaft 48 can only result in driving the two axles at the same angular velocity. It is impossible for shaft 48 to drive one coupling 30 or 32 (and, accordingly, one axle 18 or 20) faster than the other coupling or axle.

When the automobile is turning a corner, one axle will want to rotate faster than the other axle. Cornering initially causes a condition to exist similar to that illustrated in FIG. 5. However, as one axle, e.g., 18, begins to rotate faster than the other axle 20 as shown in FIG. 6, drive coupling 30 is rotated by axle 18 via clutch 54 in the direction of axle 18 causing cam 38 to move out of drive engagement with surfaces on shaft 48. This results in disconnecting axle 18 from coupling 30 and allowing axle 18 to rotate at any desired angular velocity faster than the angular velocity of axle 20. Axle 20, the slower rotating axle, will continue to be driven by shaft 48 through cam 40 and coupling 32.

Continued rotation of coupling 30 in the direction of rotation of axle 18 can result in contact between cam 38 and surfaces on shaft 48, but on the rearward cam surface 39b and hence axial movement of coupling 30 and the driving of axle 18 at the angular velocity of axle 20. This continued rotation in a positive drive is prevented by limiting the rotational movement between couplings 30 and 32 relative to one another. Applicant has prevented this continued rotation by use of balking clamps 76. As illustrated in FIG. 6, if coupling 30 continues to rotate in the direction of axle 18 at an angular velocity exceeding coupling 32, contact is made between a forward contact surface 84 of cam 38 and surface 86 of balking clamp 76. Balking clamp 76 is so configured to also ensure contact between surface 88 of cam 40 and surface 90 of balking clamp 76. This dual contact prevents the continued movement of cam 38 relative to shaft 48 thus preventing the cam 38 from making contact with shaft 48 on the opposite side. This ensures that coupling 30 will not again be driven in an opposed direction by shaft 48 when the angular velocity of axle 18 exceeds axle 20.

Due to the limited amount of axial movement that exists between couplings 30 and 32 and the relative rotation between couplings 30 and 32, the tolerances within the clutches, the distances between surfaces 84 and 88 on cams 38 and 40, and the distance between surfaces 86 and 90 on the arms 79 of balking clamps 76 must be carefully controlled. Due to the simplicity of design, of the balking clamp and the cams 38 and 40 this may be readily and inexpensively accomplished.

It can readily be seen that applicant has provided a new design of a positive drive in which critical tolerances may be easily maintained in mass production. Further, the design employs many features commonly known in current open and limited slip differentials. This results in a lower cost traction modifier since much current tooling and equipment may be used to manufacture the given positive drive design. Further minimal instruction will be required for mechanics familiar with current open or limited slip differentials to repair or replace the new positive drive. Applicant has accomplished all the foregoing while still maintaining minimal weight and size. Further the minimum weight and size has been accomplished with components that may be inexpensively manufactured without jeopardizing, in any manner, optimum operational characteristics of the positive drive. The design also adapts itself readily to the use of "C" clips or other inboard retention means for retaining the axles.

What is claimed is:

1. A positive drive comprising:
   (a) an input member adapted to be rotated by driving torque transmitted from a power source to rotate a pair of spaced output members;
   (b) first clutch means having an engaged mode which locks in a predetermined rotational relationship said input member to one of said output members when said one output member is rotating at an angular velocity in the direction of torque transmittal that is equal to or less than a predetermined angular velocity of said other output member and having a disengaged mode which allows said one output member to rotate relative to said input member when said one output member is rotating at an angular velocity in the direction of torque transmittal that is greater than a predetermined angular velocity of said other output member;
   (c) second clutch means spaced from said first clutch means and having an engaged mode which locks in a predetermined rotational relationship said input member to said other output member when said other output member is rotating at an angular velocity in the direction of torque transmittal that is equal to or less than a predetermined angular velocity of said one output member and having a disengaged mode which allows said other output member to rotate relative to said input member when said other output member is rotating at an angular velocity in the direction of torque transmittal that is greater than a predetermined angular velocity of said one output member;
   (d) first cam means having forward and rearward cam surfaces and forward and rearward contact surfaces, said first cam means being movable to move said first clutch means from said disengaged mode to said engaged mode;
   (e) second cam means having forward and rearward cam surfaces and forward and rearward contact surfaces, said second cam means being movable to move said second clutch means from said disengaged mode to said engaged mode, said first and second cam means being disposed adjacent one another with said forward and rearward cam means facing respectively said forward and rearward cam surfaces of the other cam means and, said forward and rearward contact surfaces of one cam means aligned respectively with said forward and rearward contact surfaces of the other cam means;
   (f) a balking clamp interposed between said first and second cam means and having a pair of arms, one of said arms having a forward contact surface and the other of said arms having a rearward contact surface, said forward and rearward surfaces of said balking clamp being located respectively adjacent said forward and rearward contact surfaces of said cam means to contact said cam means contact surfaces upon movement of one of said cams means relative to the other of said cam means to limit the movement of said cams means relative to one another; and
   (g) means to exert a force on at least one of said cams means to move said cam means and thereby move the respective clutch to said engaged mode.

2. The positive drive of claim 1 wherein;
   (a) each of said cam means includes a platform surface;
   (b) said contact surfaces of each of said cam means project at an angle relative to the respective platform surface;
   (c) said platform surfaces are aligned with one another; and
   (d) said balking clamp has a base adjacent said platform surfaces that supports said arms.

3. The positive drive of claim 2 wherein said base and said platform surfaces are in sliding engagement.

4. The positive drive of claim 1 or 2 wherein the forward and rearward cam surfaces of each cam means are angularly disposed relatively to one another.

5. The positive drive of claim 2 wherein:
   (a) the forward and rearward cam surfaces of said first and second cam means define a generally diamond shaped opening; and
   (b) said force exerting means is a member located within said diamond shaped opening and engageable with at least one of said cam surfaces to move the respective cam means.

6. The positive drive of claim 5 wherein:
   (a) said balking clamp base has an opening; and
   (b) force exerting member projects within said opening.

7. The positive drive of claim 2 further comprising:
   (a) resilient means biasing said first and second clutch means; and wherein
   (b) said balking clamp base is supported by said resilient means.

8. The positive drive of claim 7 wherein:
   (a) said resilient means includes a pair of spaced plates having wings facing one another;
   (b) said balking clamp has an opening;
   (c) the forward and rearward cam surfaces of said first and second cam means define a generally diamond shaped opening; and
   (d) said force exerting means is an elongated member located within said diamond shaped opening and extending through said balking clamp base opening and engageable with at least one of said cam surfaces to move the respective cam means.

9. The positive drive of claim 8 wherein said wings at least partially encircle said elongaged member and support said balking clamp base.

10. The positive drive of claim 1 wherein:

(a) each of said cam means are circumferentially movable about a common axis relative to one another; and
(b) said force exerting means moves in a direction perpendicular to said axis.

11. The positive drive of claim 10 wherein:
(a) each of said clutch means move along said axis from said disengaged mode to said engaged mode move; and 12. The positive drive of claim 11 wherein:
(a) said input member is a housing defining a cavity;
(b) said first and second clutch means are located within said cavity and rotatably and axially movable relative to said housing; and
(c) said force exerting means is a shaft secured to said housing for relative rotation.

13. The positive drive of claim 1 wherein said predetermined angular velocity that exists to move each of said clutch means to the engaged mode is substantially equal to said predetrmined angular velocity that exists to move the respective clutch means to the disengaged mode.

* * * * *